United States Patent [19]

Nakamura

[11] Patent Number: 5,455,476
[45] Date of Patent: Oct. 3, 1995

[54] VIBRATING GYROSCOPE

[75] Inventor: Takeshi Nakamura, Nagaokakyo, Japan

[73] Assignee: Murata Manufacturing Co., Ltd., Nagaokakyo, Japan

[21] Appl. No.: 340,398

[22] Filed: Nov. 15, 1994

[30] Foreign Application Priority Data

Nov. 16, 1993 [JP] Japan ................... 5-311295

[51] Int. Cl.⁶ .................................... H01L 41/08
[52] U.S. Cl. ................ 310/316; 73/504.12; 310/321; 310/329
[58] Field of Search ............... 310/316, 317, 310/319, 321, 329; 73/505, 517 R, 517 AU

[56] References Cited

U.S. PATENT DOCUMENTS 5,220,833  6/1993  Nakamura ................. 73/505
5,270,607  12/1993  Terajima ................. 310/316
5,349,857  9/1994  Kasanami et al. ................. 310/316 X Primary Examiner—Mark O. Budd
Attorney, Agent, or Firm—Nikaido, Marmelstein, Murray & Oram

[57] ABSTRACT

A vibrating gyroscope 10 includes a vibrator 12. The vibrator 12 has a regular triangular prism-shaped vibrating body 14, and piezoelectric elements 16a, 16b and 16c are formed on side faces of the vibrating body 14. Resistors 26 and 28 are connected to the piezoelectric elements 16a and 16b, and an oscillation circuit 30 and a phase correction circuit 32 are connected between the resistors 26, 28 and the piezoelectric element 16c. An opposite phase signal against a driving signal is supplied to a ground terminal of the vibrator 12. Output signals of the piezoelectric elements 16a and 16b are supplied to a differential circuit 36.

6 Claims, 5 Drawing Sheets

FIG. 4A
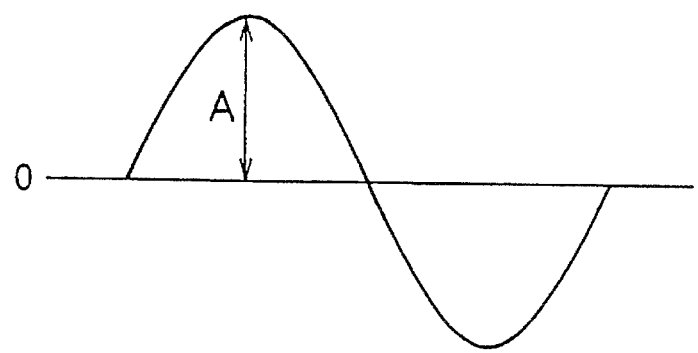
DRIVING SIGNAL
SUPPLIED TO THE
PIEZOELECTRIC
ELEMENTS 16a AND 16b
SIGNAL SUPPLIED
TO THE GROUND
TERMINAL
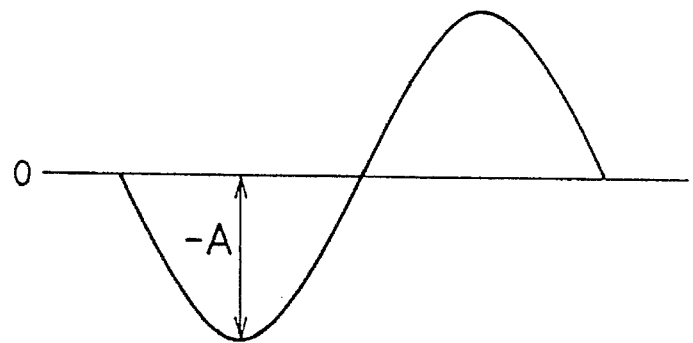
FIG. 4B DRIVING SIGNAL
SUPPLIED TO THE
PIEZOELECTRIC
ELEMENTS 4a AND 4b

VIBRATING GYROSCOPE

BACKGROUND OF THE INVENTION

1. Field of the Invention

The present invention relates to a vibrating gyroscope, and particularly to a vibrating gyroscope for detecting a rotational angular velocity by utilizing a bending vibration of a vibrating body.

2. Description of the Prior Art

FIG. 5 is an illustrative view showing an example of a conventional vibrating gyroscope. A vibrating gyroscope 1 includes a vibrator 2. As shown in FIG. 6, the vibrator 2 includes a vibrating body 3 having, for example, a regular triangular prism shape. Piezoelectric elements 4a, 4b and 4c are formed respectively on three side faces of the vibrating body 3. The piezoelectric elements 4a and 4b are used for driving to generate a bending vibration to the vibrator 2, and for detecting to obtain a signal corresponding to a rotational angular velocity. The piezoelectric element 4c is used for feedback when the vibrator 2 is driven. Supporting members 5a and 5b are attached to a ridge line in the vicinity of nodal points of the vibrating body 3. The supporting members 5a and 5b are formed with metal lead and the like, and used for ground terminals.

Resistors 6a and 6b are connected respectively to the piezoelectric elements 4a and 4b. An oscillating circuit 7 and a phase correction circuit 8 are connected to the resistors 6a and 6b. The supporting members 5a and 5b used for ground terminals are connected to an intermediate point of source voltage. Output signals of the piezoelectric elements 4a and 4b are supplied to a differential circuit 9. In the vibrating gyroscope 1, a driving signal as shown in FIG. 7 is supplied to the piezoelectric elements 4a and 4b. The vibrating body 3 bends and vibrates in a direction perpendicular to the face of the piezoelectric element 4c by the driving signal. When the vibrating body 3 rotates on its axis, a vibrating direction of the vibrating body 3 changes by a Coriolis force. Thus, a difference is produced between output signals of the piezoelectric elements 4a and 4b. A signal corresponding to a rotational angular velocity can be obtained by measuring the difference between output signals of the piezoelectric elements 4a and 4b by the differential circuit 9. A rotational angular velocity supplied to the vibrator 2 can be detected by measuring the output signal of the differential circuit 9.

However, in the vibrating gyroscope, only half voltage A of maximum source voltage is supplied to the piezoelectric elements for driving as shown in FIG. 7, because the ground terminals are connected to the intermediate point of source voltage. In the case of using low voltage source such as dry cell, a vibration is not generated to the vibrating body satisfactorily. When a vibration is not generated to the vibrating body satisfactorily, a sensitivity of the vibrating gyroscope is deteriorated. A means for compensating the sensitivity is used by using an another circuits. However, when such means is used, S/N ratio is deteriorated.

Usually, the same driving signal is supplied to two piezoelectric elements for driving, and a driving signal component is not obtained from the differential circuit. However, when resonance characteristics of driving systems change due to a variation of circumferential temperature, there is a case that the driving signal component leaks from the differential circuit. In such case, a drift signal is obtained from the differential circuit in spite of supplying no rotational angular velocity, and resulting in error detecting of rotational angular velocity.

SUMMARY OF THE INVENTION

It is, therefore, the primary object of the present invention to provide a vibrating gyroscope which can be driven satisfactorily by using a low voltage source, and has less drift signal, and has high sensitivity.

The present invention is directed to a vibrating gyroscope comprising a prism-shaped vibrating body, a piezoelectric element formed on a side face of the vibrating body, an oscillation circuit for supplying a driving signal to the piezoelectric element in order to generating a vibration to the vibrating body, and an inversion circuit for supplying an opposite phase signal against the driving signal to a ground terminal.

By supplying an opposite phase signal against the driving signal to the ground terminal, a source voltage which is twice voltage against a driving signal supplied to the conventional vibrating gyroscope is supplied to the piezoelectric elements for driving, and a vibration is generated to the vibrating body. When matching is obtained between an input impedance of the vibrator from the piezoelectric element for driving and a terminal impedance of driving circuit from the piezoelectric element for driving, since an opposite phase signal against the driving signal is supplied to the ground terminal, a voltage at input portion of the driving signal becomes zero.

According to the present invention, a vibration is generated to the vibrating body satisfactorily even when a low voltage source such as dry cell is used, because the vibration is generated with a twice voltage against the driving signal of conventional vibrating gyroscope. Therefore, large vibration amplitude of the vibrating body can be obtained, and a rotational angular velocity can be detected with high sensitivity. A leakage of a driving signal component from the differential circuit can be prevented because a voltage at input portion of the driving signal becomes zero, and a drift signal can be reduced.

The above and further objects, features, aspects and advantages of the present invention will be more fully apparent from the following detailed description with the accompanying drawings.

BRIEF DESCRIPTION OF THE DRAWINGS

FIG. 4 is a wave diagram showing a driving signal supplied to a piezoelectric element and a signal supplied to a ground terminal.

DESCRIPTION OF THE PREFERRED EMBODIMENTS

Figure 1:
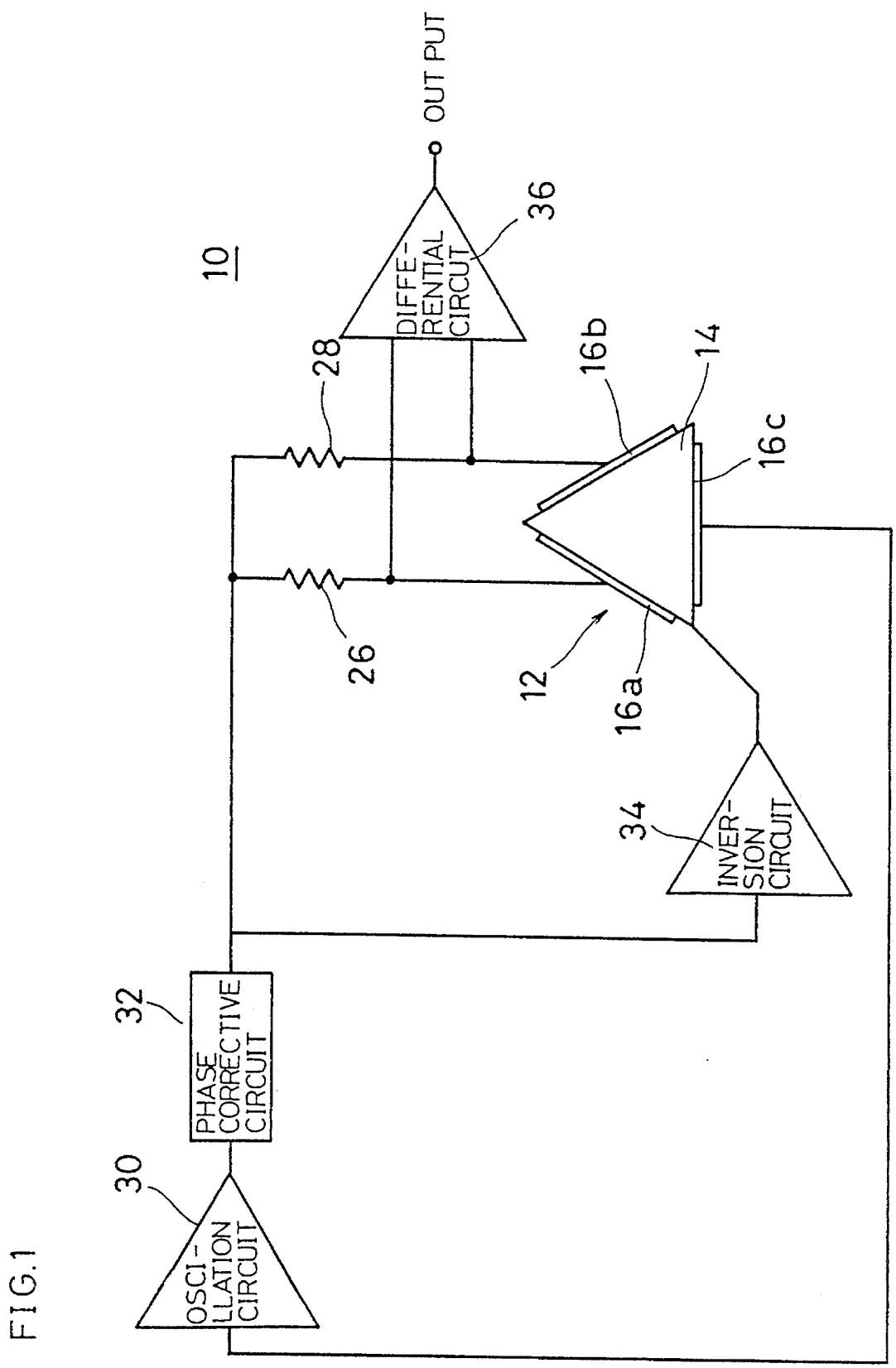
FIG. 1 is an illustrative view showing an embodiment of the present invention.
Figure 2:
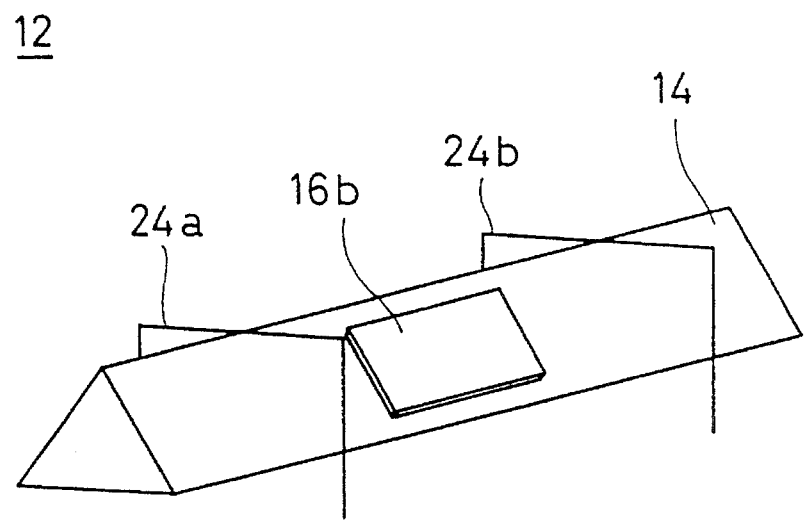
FIG. 2 is a perspective view showing a vibrator of the vibrating gyroscope of FIG. 1.

FIG. 1 is an illustrative view showing an embodiment of the present invention. A vibrating gyroscope 10 includes a vibrator 12. As shown in FIG. 2, the vibrator 12 includes a vibrating body 14 having, for example, a regular triangular prism shape. The vibrating body 14 is formed with materials that generates a mechanical vibration such as elinver, iron-nickel alloy, quartz, glass, crystal, ceramics or the like.

Figure 3:
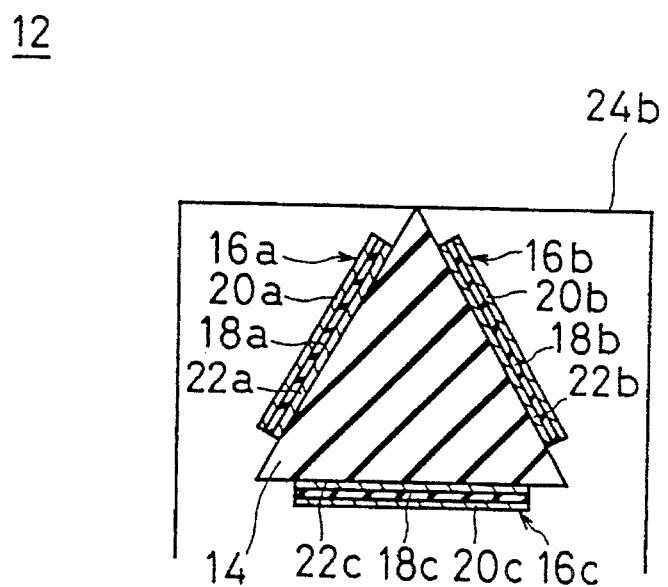
FIG. 3 is a sectional view showing the vibrator of FIG. 2.
Figure 5:
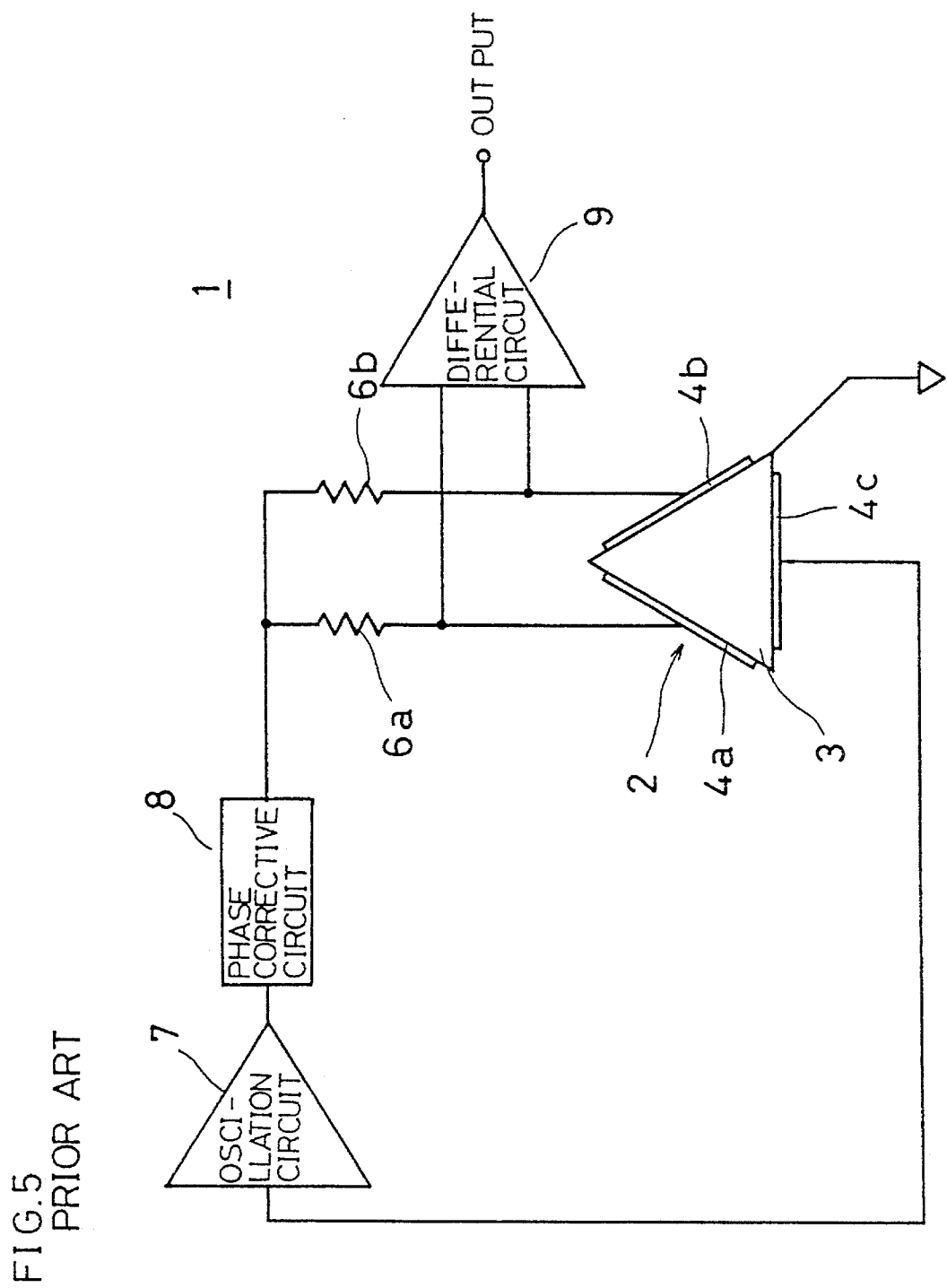
FIG. 5 is an illustrative view showing a conventional vibrating gyroscope.
Figure 6:
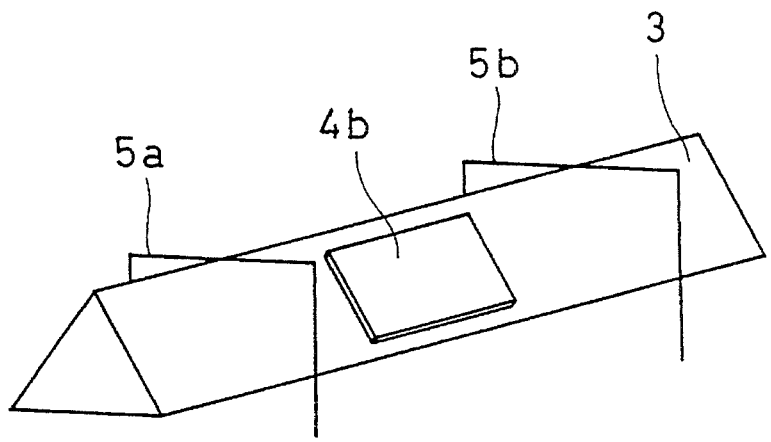
FIG. 6 is a perspective view showing the vibrator of the conventional vibrating gyroscope of FIG. 5.
Figure 7:
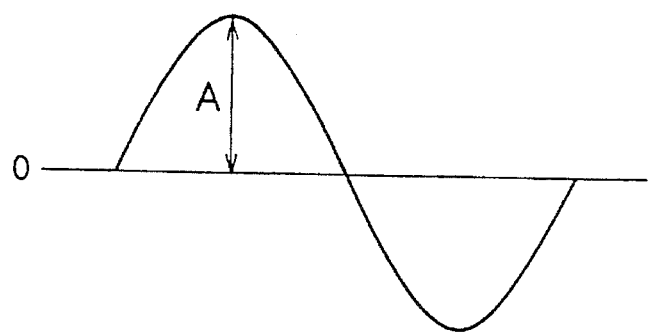
FIG. 7 is a wave diagram showing a driving signal for generating a vibration to the conventional vibrating gyroscope.

Piezoelectric elements 16a, 16b and 16c are formed on side faces of the vibrating body 14. As shown in FIG. 3, the piezoelectric element 16a includes a piezoelectric plate 18a made of, for example, piezoelectric ceramics, and electrodes 20a and 22a are formed on both faces of the piezoelectric plate 18a. One electrode 22a is bonded to the vibrating body 14. Similarly, the piezoelectric elements 16b and 16c include piezoelectric plates 18b and 18c, and electrodes 20b, 22b and electrodes 20c, 22c are formed on both faces of respective piezoelectric plates 18b, 18c. One electrodes 22b and 22c of the piezoelectric elements 16b and 16c are bonded to the vibrating body 14. The piezoelectric elements 16a and 16b are used for driving to generate a bending vibration to the vibrating body 14, and for detecting to obtain a signal corresponding to a rotational angular velocity. The piezoelectric element 16c is used for feedback when a bending vibration is generated to the vibrating body 14.

Supporting members 24a and 24b are attached to a ridge line of the vibrating body 14 in the vicinity of nodal points. The supporting members 24a and 24b are formed, for example, with a metal lead which is bent in a U shape. Ends of the supporting members 24a and 24b are fixed to a supporting plate and the like.

Resistors 26 and 28 are connected to the piezoelectric elements 16a and 16b. An oscillation circuit 30 and a phase correction circuit 32 are connected between the resistors 26, 28 and the piezoelectric element 16c. An inversion circuit 34 is connected to a ground terminal, and opposite phase signal against a driving signal supplied to the piezoelectric elements 16a, 16b is supplied to the ground terminal. As the ground terminal, for example, the supporting members 24a and 24b are used. The piezoelectric elements 16a and 16b are connected to an input terminal of a differential circuit 36.

When the vibrating gyroscope 10 is used, a driving signal as shown in FIG. 4 is supplied to the piezoelectric elements 16a and 16b. The driving signal is inversed by the inversion circuit 34, and an opposite phase signal against the driving signal is supplied to the ground terminal. Thus, when a voltage of the driving signal is A, a vibration is generated to the vibrator 12 by a signal having a voltage of 2A. By the signal, the vibrating body 14 bends and vibrates in a direction perpendicular to the face of the piezoelectric element 16c. At this time, signals generated in the piezoelectric elements 16a and 16b have the same phase and the same level, and a signal is not obtained from the differential circuit 36. Therefore, it is known that a rotational angular velocity is not supplied to the vibrating gyroscope 10.

In this situation, when the vibrating body 14 rotates on its axis, a vibrating direction of the vibrating body 14 changes due to a Coriolis force. A difference is produced between signals generated in the piezoelectric elements 16a and 16b, and the difference is obtained from the differential circuit 36. The signal obtained from the differential circuit 36 is corresponding to a rotational angular velocity. Thus, the rotational angular velocity can be detected by measuring the output signal of the differential circuit 36.

In the vibrating gyroscope 10, since an opposite phase signal against the driving signal is supplied to the ground terminal, a vibration is generated to the vibrating body 14 by a signal having twice voltage as compared with a conventional vibrating gyroscope whose ground terminal is connected to an intermediate point of a source voltage. Thus, a vibration is generated to the vibrating body 14 satisfactorily even when a low voltage source such as dry cell is used. A vibrating amplitude of the vibrating body 14 becomes large as compared with the conventional vibrating gyroscope, and a detecting sensitivity of a rotational angular velocity can be increased.

As to the driving signal, since an opposite phase signal against the driving signal is supplied to the ground terminal, a voltage at input portion to the piezoelectric elements 16a and 16b becomes intermediate point between the driving signal and the opposite phase signal. Thus, when matching is obtained between an input impedance from the piezoelectric elements 16a, 16b and a terminal impedance of a driving circuit from the piezoelectric elements 16a, 16b, a voltage at an input portion becomes zero apparently. Therefore, a leakage of the driving signal component from the differential circuit 36 can be prevented, and a drift signal can be reduced.

Though the vibrating body 14 is formed in a regular triangular prism shape in the above embodiment, the vibrating body 14 may be formed in other shapes such as rectangular prism shape, hexagonal prism shape or circular prism shape. By supplying an opposite phase signal against the driving signal to the ground terminal of the vibrator, a vibrating amplitude of the vibrating body can be increased, and a gyroscope having high sensitivity can be obtained.

While the present invention has been particularly described and shown, it is to be understood that such description is used merely as an illustration and example rather than limitation, and the spirit and scope of the present invention is determined solely by the terms of the appended claims.

What is claimed is:

1. A vibrating gyroscope comprising;
   a prism-shaped vibrating body;
   a piezoelectric element formed on a side face of said vibrating body,
   an oscillating circuit for supplying a driving signal to said piezoelectric element in order to driving a vibration to said vibrating body, and
   an inversion circuit for supplying an opposite phase signal against said driving signal to a ground terminal.

2. A vibrating gyroscope in accordance with claim 1, which further comprises a supporting member for supporting said vibrating body, and used for said ground terminal.

3. A vibrating gyroscope in accordance with claim 2, wherein said supporting member is attached to said vibrating body in the vicinity of nodal point of said vibrating body.

4. A vibrating gyroscope in accordance with claim 1, wherein said vibrating body is formed in a regular triangular prism shape.

5. A vibrating gyroscope in accordance with claim 2, wherein said vibrating body is formed in a regular triangular prism shape, and said supporting member is attached to a ridge line of said vibrating body.

6. A vibrating gyroscope in accordance with claim 3, wherein said vibrating body is formed in a regular triangular prism shape, and said supporting member is attached to a ridge line of said vibrating body.

* * * * *